UNITED STATES PATENT OFFICE.

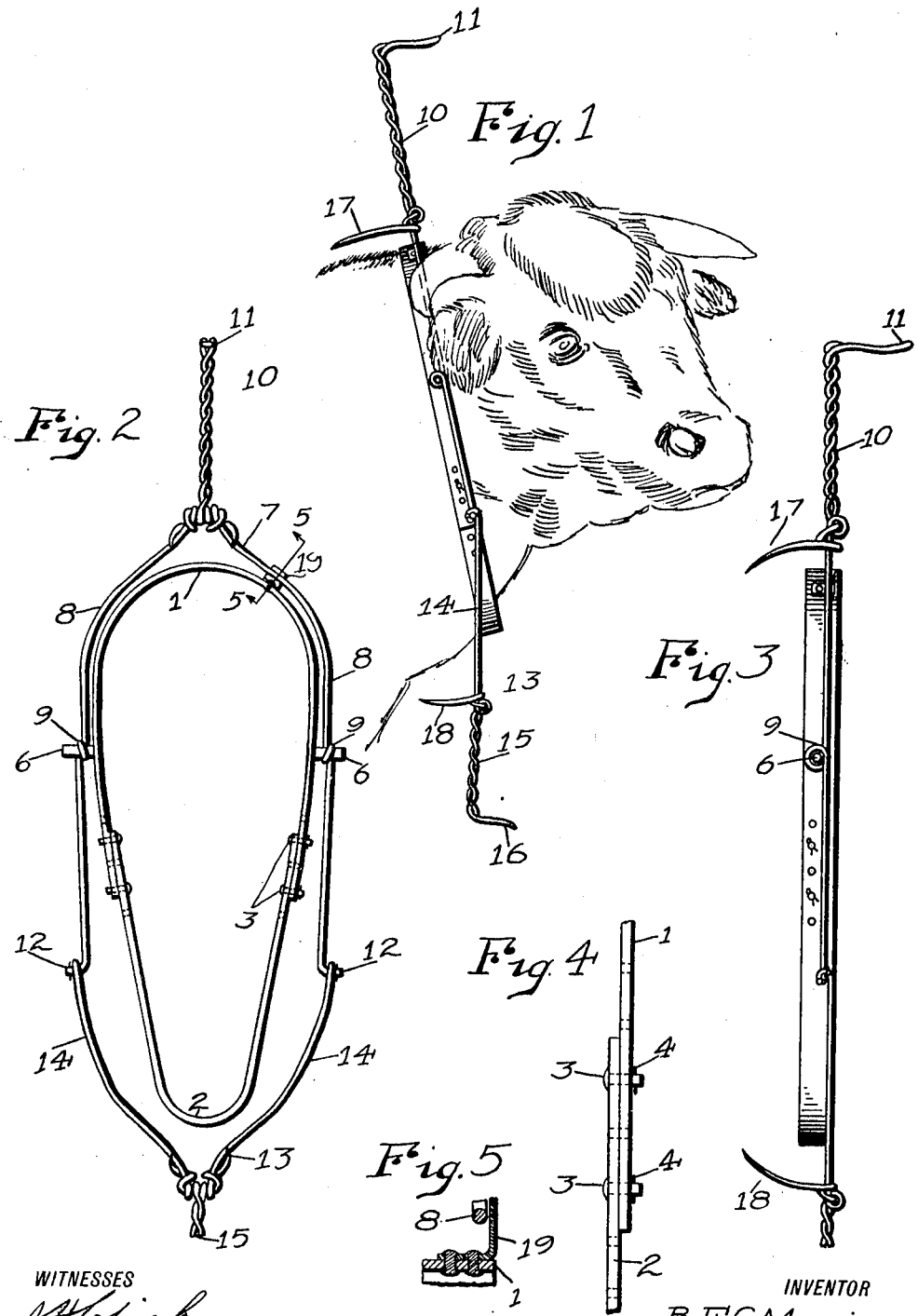

BENJAMIN FREDK. C. MORRIS, OF OKLAHOMA, OKLAHOMA.

ANIMAL-POKE.

1,314,532. Specification of Letters Patent. Patented Sept. 2, 1919.

Application filed March 20, 1919. Serial No. 283,709.

*To all whom it may concern:*

Be it known that I, BENJAMIN FREDERICK C. MORRIS, a citizen of the United States, and a resident of Oklahoma, in the county of Oklahoma and State of Oklahoma, have invented certain new and useful Improvements in Animal-Pokes, of which the following is a specification.

My invention is an improvement in animal pokes, and has for its object to provide a simple, inexpensive device of the character specified, that will effectually prevent the animal wearing the same from passing through, under or over fences, wherein spurs or lugs are provided for pricking the animal, the said spurs or lugs being mounted to move approximately perpendicular to the skin, and wherein a collar is provided that will prevent dislodgment of the poke, while at the same time will not interfere with the legitimate movements of the animal, as in grazing, drinking or the like. This device also fits so far forward that the animal cannot get its feet to the fence.

In the drawings:—

Figure 1 is a side view of the poke in use,

Fig. 2 is a front view,

Fig. 3 is a side view,

Fig. 4 is a detail of the connection between the sections of the collar,

Fig. 5 is a section on the line 5—5 of Fig. 2.

In the present embodiment of the invention, a collar is provided consisting of two substantially U-shaped sections 1 and 2, which are detachably connected together, in order that the collar will adjust to various sizes of necks, thereby making a snug fit which holds the yoke far from the animal's front feet. The upper section 1 which is relatively large is adapted to engage over the neck of the animal, while the lower section 2 which is relatively small, is adapted to engage beneath the neck, and the lapping ends of the sections are detachably connected by pins 3, which are passed through registering openings in the sections, and they are engaged by cotter pins 4 on the opposite side as shown more particularly in Fig. 4.

The upper section 1 of the collar has oppositely extending journal pins 6 intermediate the length of its arms, and upon these journal pin is mounted to swing a yoke consisting of a body 7 and arms 8, and each arm has an eye 9 intermediate its ends, which engages over the adjacent journal pin, being thereby most sensitively balanced.

This yoke is formed from wire of suitable gage, and at the center of the wire it is twisted together to form an upstanding arm 10, and the free end of the arm is bent forwardly as indicated at 11, at right angles to the body of the arm.

The free end of each arm 8 of the yoke 7—8 has an outwardly bent lug 12, and upon these lugs is mounted a second yoke consisting of a body 13 and arms 14, the arms 14 having eyes which engage over the lugs 12, and the eyes are held from disengagement by cotter pins as shown.

The yoke 13—14 is also formed from wire bent to shape, and the intermediate portion of the wire is twisted together to form an arm 15, somewhat similar to the arm 10, and the extremity of the arm is bent forward at right angles to the body in the same manner as the portion 16 is bent with respect to the portion 15.

The body of each yoke 7—8 and 13—14 is provided with rearwardly extending pointed spurs or lugs 17 and 18 respectively, four lugs being provided in each instance. Referring to Figs. 1 and 3, it will be noticed that these lugs 17 and 18 are curved longitudinally, being arranged with their concave faces toward the animal.

The upper yoke 7—8 is limited in its swinging movement by the angle plate 19, on one of the arms of the upper section 1 of the collar. This plate is riveted to the section 1 of the collar, and it will be noted referring to Fig. 5, that the collar is of relatively great width. The lower yoke 13—14 may swing freely on the journal pins 12, so that when the lower end of the yoke is engaged by a fence or other obstruction, the yoke will be swung rearwardly to cause the spurs or lugs 18 to prick the animal, and these spurs or lugs will move approximately perpendicular to the skin, out of friction with animal's neck, therefore most sensitive to the touch or fence.

The upper sensitized yoke will also freely swing when engaged by any obstruction, and the spurs or lugs 17 will perform a like function at the top of the neck. It will be noticed that the collar sections are adjustable with respect to each other, a series of openings being provided in each section for this purpose, enabling a snug fit to all sizes of necks, in order that the poke may be held in position far forward on the neck, making it impossible for the animal to reach the fence with its forefeet.

It will be understood that the upper yoke may have a hook on which to suspend the lower yoke, and both yokes may be of flat material instead of round, as desired.

I claim:—

1. A poke of the character specified, comprising a sectional collar, the sections being adjustable with respect to each other, said collar having laterally extending journal pins near its upper end, a yoke shaped member comprising a body having an upstanding arm at the top of the yoke, and provided with a forward extension, and arms having eyes journaled on the pins, and a second yoke shaped member comprising a body having a downwardly extending arm, provided with a forward extension, and arms pivoted on the first named arms, said yoke bodies carrying rearwardly extending spurs, the spurs being approximately perpendicular to the planes of the yoke.

2. A poke comprising a collar for engaging the animal's neck, a pair of yokes each comprising a body and arms, the arms of the yokes being pivotally connected, and the yokes being of a size to fit loosely about the collar, the uppermost yoke being pivoted to the collar intermediate the length of the arms, the bodies of the yokes carrying pointed spurs extending endwise toward the animal, and each yoke body having an extension in the plane of the yoke.

B. FREDK. C. MORRIS.

Witnesses:
RUTH MAHER,
F. P. HOCKER.

Copies of this patent may be obtained for five cents each, by addressing the "Commissioner of Patents, Washington, D. C."